(No Model.)

W. H. WHITELEY.
APPARATUS FOR DEGUMMING SILK OR OTHER FIBERS.

No. 483,335.      Patented Sept. 27, 1892.

WITNESSES:
P. H. Aagler
L. Douville.

INVENTOR
William H. Whiteley
BY John A. Wiederskeim
ATTORNEY.

UNITED STATES PATENT OFFICE.

WILLIAM H. WHITELEY, OF DARBY, PENNSYLVANIA.

APPARATUS FOR DEGUMMING SILK OR OTHER FIBERS.

SPECIFICATION forming part of Letters Patent No. 483,335, dated September 27, 1892.

Application filed August 22, 1891. Serial No. 403,431. (No model.)

*To all whom it may concern:*

Be it known that I, WILLIAM H. WHITELEY, a citizen of the United States, residing at Darby, in the county of Delaware, State of Pennsylvania, have invented a new and useful Improvement in Apparatus for Degumming Silk or Other Fibers, which improvement is fully set forth in the following specification and accompanying drawings.

My invention consists of an apparatus for effectively removing gum from silk and other fiber, the same embodying a tank wherein the fiber is placed, an inclosing vessel for the liquor or material employed, and a chamber for steaming or heating said liquor.

It also consists in forming the receiving-tank of wood, so as to avoid subjecting the fiber to metallic contact.

Figure 1:
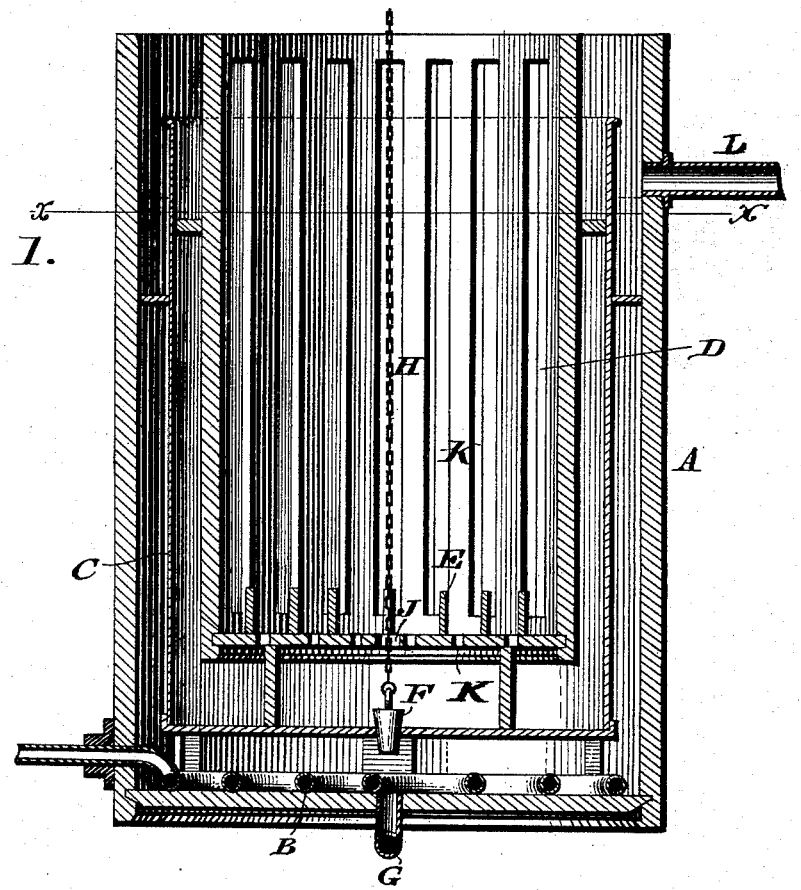
Figure 2:
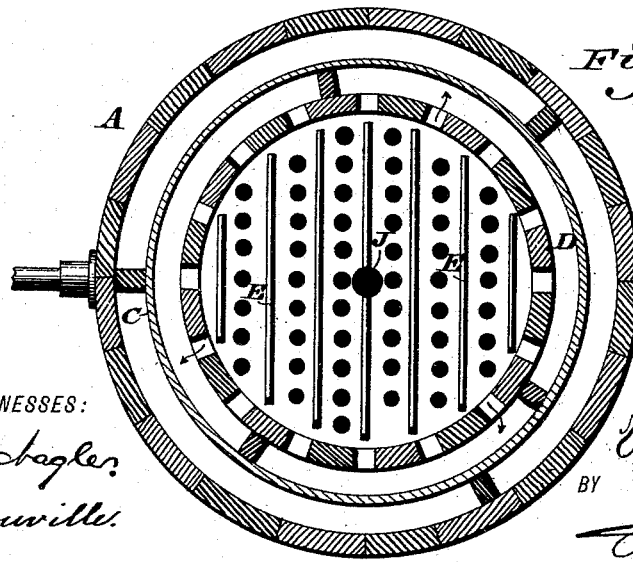

Figure 1 represents a vertical section of an apparatus for degumming silk and other fiber embodying my invention. Fig. 2 represents a horizontal section thereof on line $x\,x$, Fig. 1.

Similar letters of reference indicate corresponding parts in the two figures.

Referring to the drawings, A designates a chamber or tank having within the same a coiled or other steam-pipe B for heating the water or other liquid.

C designates a metallic vessel, which is placed within the tank A so as to be separated therefrom and receiving a fluid—such as soap liquor—suitable for degumming silk or other fiber, which latter is placed within the tank D, said silk being either in the cocoon, waste from the cocoon, or net or reeled silk containing gum, said tank D being formed of wood and supported in the vessel C so as to leave a space on its sides and bottom between it and the said vessel and having its side and bottom slotted or perforated, whereby communication is established between said tank and vessel. Rising from the bottom of the tank D, which is provided with a number of holes or openings K, are battens E, which are formed of wood and serve to support the fiber and prevent clogging of the open bottom of the tank. In the bottom of the vessel C is a plug F, with which is connected a chain or cord H, the latter passing through an opening J in the bottom of the tank D, and made conveniently accessible at the top thereof.

The operation is as follows: The fiber to be degummed is placed in the tank D and water is poured in said tank until the vessel C, which receives the water from the tank, is filled, or nearly so, when the contents of said tank and vessel are heated by means of the steam-coil B. As the fluid or liquid in the vessel C becomes heated the gum in the fiber in the tank D is softened and liberated therefrom, so as to escape through the slots or openings K into the vessel C, and rising to the top of the water overflows, on more water being added to the tank D, the edge of the said vessel into the tank A, where it remains until the overflow rises to the level of the waste-pipe L, when it flows through the same without entering the vessel C. By having the slots K in the tank D extending above the top of the vessel C the impurities which flow from said tank into the vessel C readily escape from the said vessel without returning to the tank, and by having the overflow-pipe L below the top of the vessel the impurities pass out from the tank A without returning to the said vessel C.

The tank D is made of wood, as has been stated, whereby the fiber is prevented from coming in contact with a metallic surface, which would otherwise discolor or injure the same. The tank and vessel may be made removable for purposes of repairs, &c.

Having thus described my invention, what I claim as new, and desire to secure by Letters Patent, is—

1. A tank having a heating device therein, a metallic vessel supported in said tank, and a perforated wooden tank supported in said vessel, said metallic vessel having its top below the top of the said inner tank, said parts being combined substantially as described.

2. A tank having a coil of steam-pipe therein, a vessel supported in said tank, and a perforated wooden tank supported in said vessel, said vessel having its top below the top of said inner tank and said outer tank having an overflow-pipe below said top of the said vessel, said parts being combined substantially as described.

WILLIAM H. WHITELEY.

Witnesses:
JOHN A. WIEDERSHEIM,
A. P. JENNINGS.